(12) United States Patent
Sievert et al.

(10) Patent No.: US 9,542,292 B2
(45) Date of Patent: Jan. 10, 2017

(54) DESIGNING OPERATIONS INTERFACE TO ENHANCE SITUATIONAL AWARENESS

(75) Inventors: Stefan Sievert, Oakland, CA (US); Adam John Richards, Concord, CA (US)

(73) Assignee: YAHOO! INC., Sunnyvale, CA (US)

( * ) Notice: Subject to any disclaimer, the term of this patent is extended or adjusted under 35 U.S.C. 154(b) by 7 days.

(21) Appl. No.: 13/429,043

(22) Filed: Mar. 23, 2012

(65) Prior Publication Data
US 2013/0254711 A1    Sep. 26, 2013

(51) Int. Cl.
*G06F 11/30* (2006.01)
*G06F 3/0484* (2013.01)
*G06F 11/32* (2006.01)

(52) U.S. Cl.
CPC ....... *G06F 11/3072* (2013.01); *G06F 3/04847* (2013.01); *G06F 11/3075* (2013.01); *G06F 11/321* (2013.01); *G06F 2201/86* (2013.01); *G06F 2203/04803* (2013.01)

(58) Field of Classification Search
CPC ............. G06F 3/048–3/04897; G06F 11/3072; G06F 11/3075; G06F 11/321; G06F 2201/86; G06F 3/04847; G06F 2203/04803
USPC .......................... 715/736, 739, 792, 810, 814
See application file for complete search history.

(56) References Cited

U.S. PATENT DOCUMENTS

| | | | |
|---|---|---|---|
| 7,089,278 B1* | 8/2006 | Churchill ............... | G06Q 10/10 709/203 |
| 7,467,192 B1* | 12/2008 | Lemler ............... | H04L 41/5006 709/220 |
| 2004/0098462 A1* | 5/2004 | Horvitz et al. ............... | 709/207 |
| 2005/0022189 A1* | 1/2005 | Proulx ................... | H04L 41/00 718/100 |
| 2005/0228763 A1* | 10/2005 | Lewis et al. ...................... | 706/1 |
| 2006/0085367 A1* | 4/2006 | Genovese ........................ | 706/44 |
| 2007/0192128 A1* | 8/2007 | Celestini ........................ | 705/1 |
| 2007/0233854 A1* | 10/2007 | Bukovec et al. ............. | 709/224 |
| 2008/0016569 A1* | 1/2008 | Hammer et al. ................. | 726/23 |
| 2008/0155008 A1* | 6/2008 | Stiles et al. .................... | 709/201 |
| 2011/0035326 A1* | 2/2011 | Sholl et al. ................... | 705/317 |
| 2011/0134797 A1* | 6/2011 | Banks .................. | H04W 40/246 370/254 |
| 2012/0209925 A1* | 8/2012 | Lee et al. ...................... | 709/206 |
| 2013/0150686 A1* | 6/2013 | Fronterhouse et al. ....... | 600/323 |
| 2013/0151421 A1* | 6/2013 | Van Der Ploeg et al. ..... | 705/301 |
| 2013/0238356 A1* | 9/2013 | Torii et al. ........................ | 705/2 |
| 2014/0245439 A1* | 8/2014 | Day ..................... | G06F 21/552 726/23 |

* cited by examiner

*Primary Examiner* — Nicholas Ulrich
(74) *Attorney, Agent, or Firm* — Cooper Legal Group, LLC

(57) ABSTRACT

Enhancing situational awareness in operations management includes: generating a user interface incorporating multiple display interfaces; receiving event data for a plurality of events monitored by an operator viewing the multiple display interfaces; receiving context data for the plurality of events, wherein the context data is received from multiple sources; matching the plurality of the events with the context data; determining the events which the operator must handle as priority events; displaying the priority events; and reducing saliency of any events and tasks that are not associated with the priority events.

20 Claims, 11 Drawing Sheets

FIG. 1 - Prior Art

DESIGNING OPERATIONS INTERFACE TO ENHANCE SITUATIONAL AWARENESS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information technology, and more particularly relates to the field of application.

BACKGROUND OF THE INVENTION

Situation awareness, or SA, is the perception of environmental elements with respect to time and/or space, the comprehension of their meaning, and the projection of their status after some variable has changed, such as time. It is also concerned with perception of the environment critical to decision-makers in complex, dynamic areas from aviation, air traffic control, power plant operations, military command and control, and emergency services such as fire fighting and policing; to more ordinary but nevertheless complex tasks such as driving an automobile or bicycle.

Situation awareness involves being aware of what is happening in the vicinity to understand how information, events, and one's own actions will impact goals and objectives, both immediately and in the near future. Lacking SA or having inadequate SA has been identified as one of the primary factors in accidents attributed to human error. Thus, SA is especially important in work domains where the information flow can be quite high and poor decisions may lead to serious consequences (e.g., piloting an airplane, functioning as a soldier, or treating critically ill or injured patients). Having complete, accurate and up-to-the-minute SA is essential where technological and situational complexity are a concern. SA has been recognized as a critical, yet often elusive, foundation for successful decision-making across a broad range of complex and dynamic systems, including aviation and air traffic control, emergency response and military command and control operations, and offshore oil and nuclear power plant management.

In the management of complex information technology (IT) operations, situational awareness is addressed by providing an operator with multiple displays featuring all network activities and their status. These displays are usually independent and consume a large amount of the operator's cognition to manage, leading to lower levels of situational awareness. This in turn produces a natural reluctance to change focus (only manage one incident at a time per operator), lengthy hand-offs of status between shift operators, lack of awareness of how an incident might interact with others and a tendency to ignore new incidents of higher priority, with a lengthening of response times for all incidents. FIG. 1 shows a simplified illustration of the state of the art in managing IT operations. A continuous flow of network events arrives in an event stream 110. This stream is catalogued into an event list 120. This event list 120 is what the IT operator 180 references in monitoring network operations using, for example, Simple Network Management Protocol (SNMP). SNMP is an Internet-standard protocol for managing devices on IP networks. SNMP is widely used as part of an operations interface/cockpit for monitoring networked devices. The operator 180 must perform multiple functions 130 with this information to generate new data which he/she inputs into information tools 140. These multiple functions include: placing the event in context, determining state, determining correlation of events, analysis of this correlation, and taking appropriate action.

FIG. 2 shows a high-level flowchart of operations control, according to the known art. FIG. 3 shows the steps taken to respond to an incident, according to the known art.

SUMMARY OF THE INVENTION

Briefly, according to an embodiment of the invention a method for enhancing situational awareness in operations management includes using a processor device for performing steps or acts of: generating a user interface incorporating multiple display interfaces; receiving event data for a plurality of events monitored by an operator viewing the multiple display interfaces; receiving context data for the plurality of events, wherein the context data is received from multiple sources; matching the plurality of the events with the context data; determining the events which the operator must handle as priority events; displaying the priority events; and reducing saliency of any events and tasks that are not associated with the priority events.

According to another embodiment of the present invention, a system for enhancing situational awareness in operations management includes a memory with computer-executable instructions and a processor device operably configured to the memory for executing the instructions.

According to another embodiment of the present invention, a computer-readable storage medium has instructions stored therein for enhancing situational awareness in operations management. The instructions are executed by a computer and includes steps or acts of: generating a user interface incorporating multiple display interfaces; receiving event data for a plurality of events monitored by an operator viewing the multiple display interfaces; receiving context data for the plurality of events, wherein the context data is received from multiple sources; matching the plurality of the events with the context data; determining the events which the operator must handle as priority events; displaying the priority events; and reducing saliency of any events and tasks that are not associated with the priority events.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
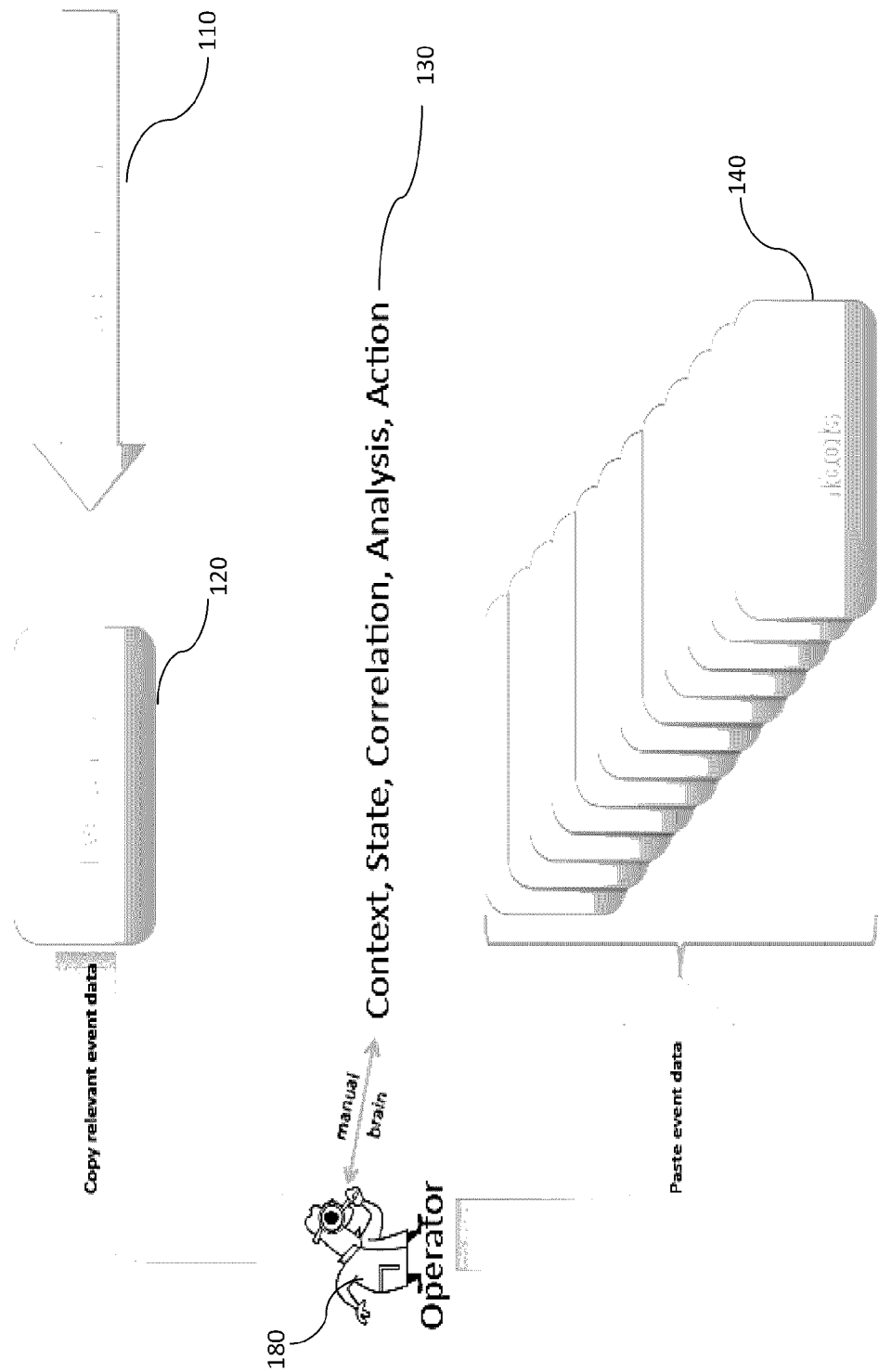
FIG. 1 is a simplified illustration of an operator scenario, according to the known art.
Figure 2:
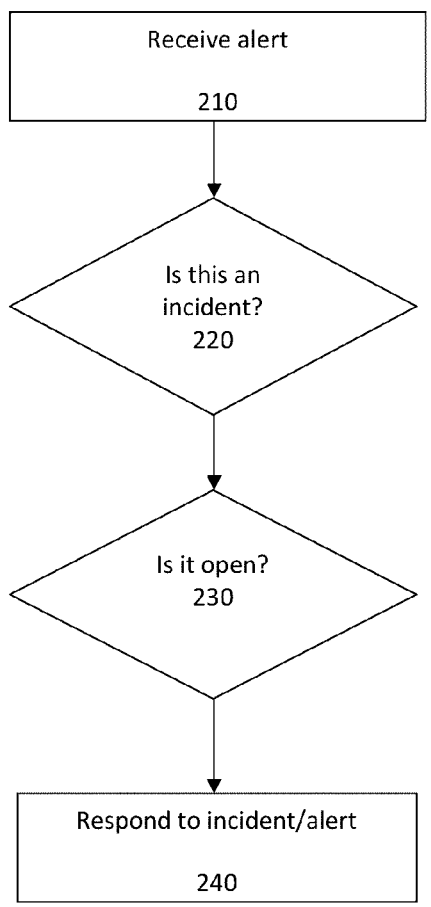
FIG. 2 shows a high-level flowchart of operations control, according to the known art.
Figure 3:
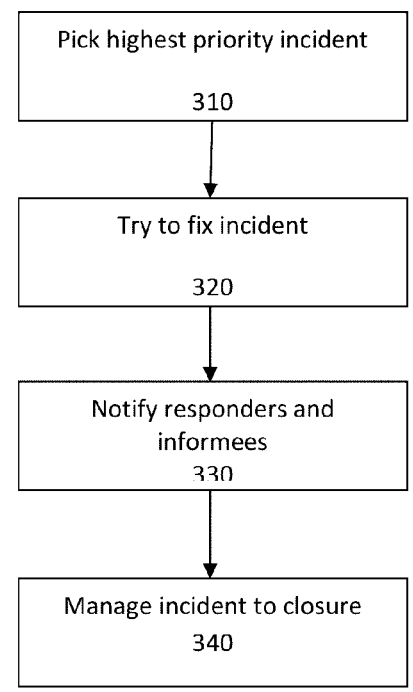
FIG. 3 shows a high-level flowchart of incident response, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The terms "situation awareness" and "situational awareness," abbreviated as "SA," are used interchangeably throughout this document and their meaning is construed to be the same for purposes of this document.

We describe visual aspects of augmenting and enhancing situational awareness for operators tasked with managing information technology (IT) across networks. To this end we propose a novel user interface (UI) design with much improved usability in general, and an enhancement of the operator's ability to maintain situational awareness (SA) in particular. We achieve this enhancement by:

a) removing mundane tasks from the operator's cognitive workload;

b) increasing the saliency of high-priority events; and c) grouping all tasks related to event management in one place.

We leverage a mashup engine to build unified views of event data from different sources, configure the project, and then create and deploy a composite application. We focus on visual aspects of creating situational awareness for operators monitoring complex IT operations management conditions. These conditions can include: CPU utilization, network connectivity, functional capability or other events that require remedial action. As used herein, a situation describes the condition of the complete environment and can entail multiple incidents. For example, we could have a situation where multiple Internet services are experiencing issues caused by independent (or related) incidents.

Figure 4:
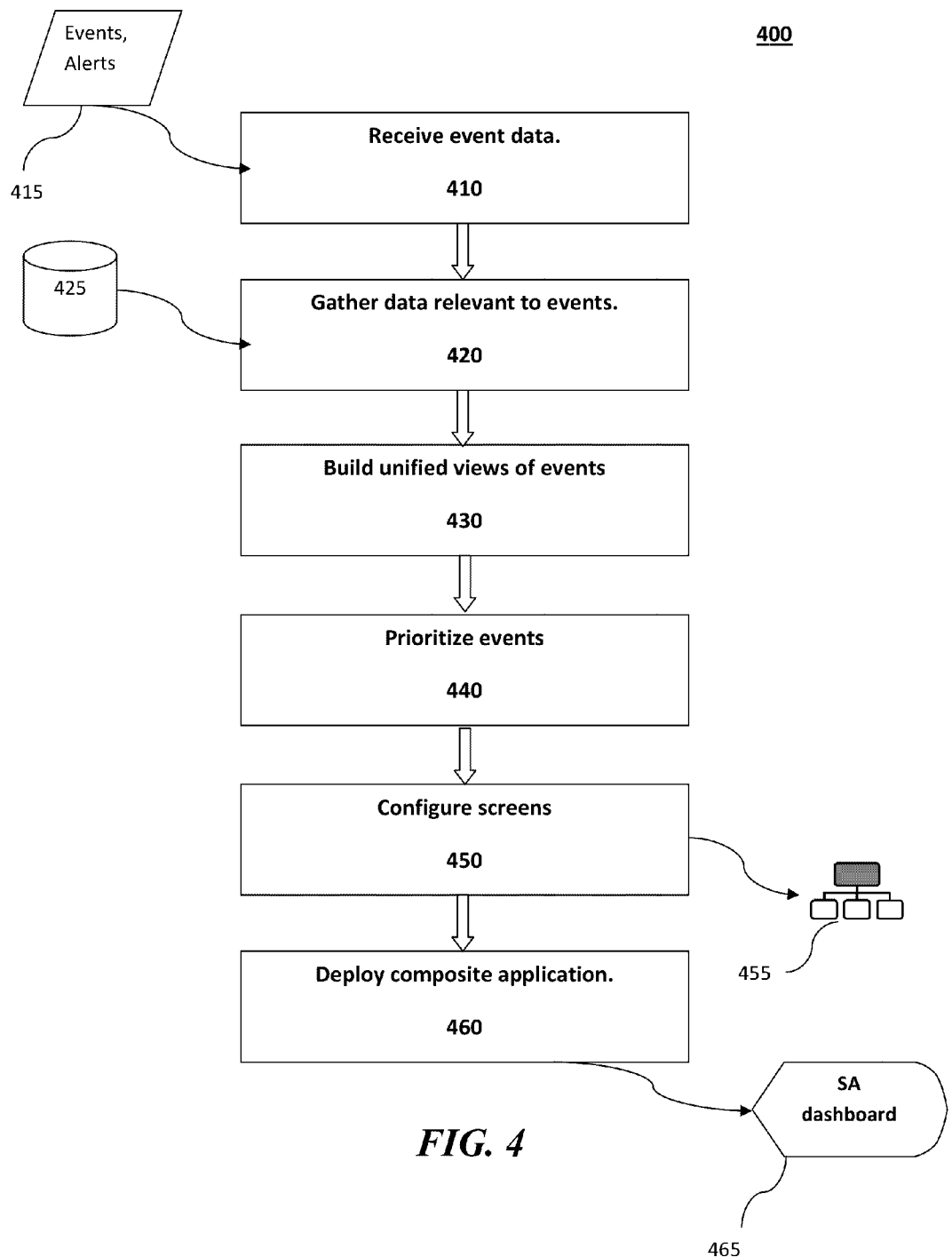
FIG. 4 shows a flowchart of the method according to an embodiment of the present invention.

Referring now to FIG. 4 we discuss the process flow for situational awareness in operations management, according to an embodiment of the present invention. First, in step 410 we receive the event data 110. An exemplary event is a server running low on memory space. We can receive the event data 110 through known event-monitoring applications 415 and the like. Once we receive the events 110, we perform some data mining to gather context data that is relevant to the events in step 420. This data can range from a description of what to do to prevent running out of memory, to a projection of what possible effects will present when the event is serviced. To this end we access multiple sources 425 (both internal and external sources) for any relevant data, such as company personnel to contact, instructions for repairing/replacing components, and so forth.

Next we aggregate the data from the multiple sources to build unified views of the events 430. We match each event with the contextual data that is relevant to that event. For the event alerting the operator to the condition of running low on memory space, for example, we may want to provide instructions for off-loading some tasks, and delaying others, as well as providing a time-line showing the effects of delaying the tasks. Further we may provide, as part of the SA dashboard, the email address of the network manager and the proprietary e-mail interface in order to send a quick note about the situation. Note that these different contextual data elements can be displayed on different monitors, terminals, screens, windows; or they can be displayed together in one window.

In step 440 we prioritize the events because, according to our saliency prerequisite, we emphasize the higher-priority events and de-emphasize the lower-priority events. Next we arrange and configure the screens/windows 455 in step 450 so that the higher-priority events are given more "real-estate" on a screen/window and so that event context (gathered in step 420) is presented in association with the event in the same or a different screen/window. In one embodiment this can mean presenting the list of prioritized events on one screen, and their associated event context on another screen. The operator selects the event by clicking on the event, or using a mouse-over or roll-over to bring up the context on an adjacent screen or an adjacent window within the same screen. Once the placement is set and the screens/windows are configured, we deploy the composite application in step 460. This deployment produces the SA dashboard 465.

Figure 5:
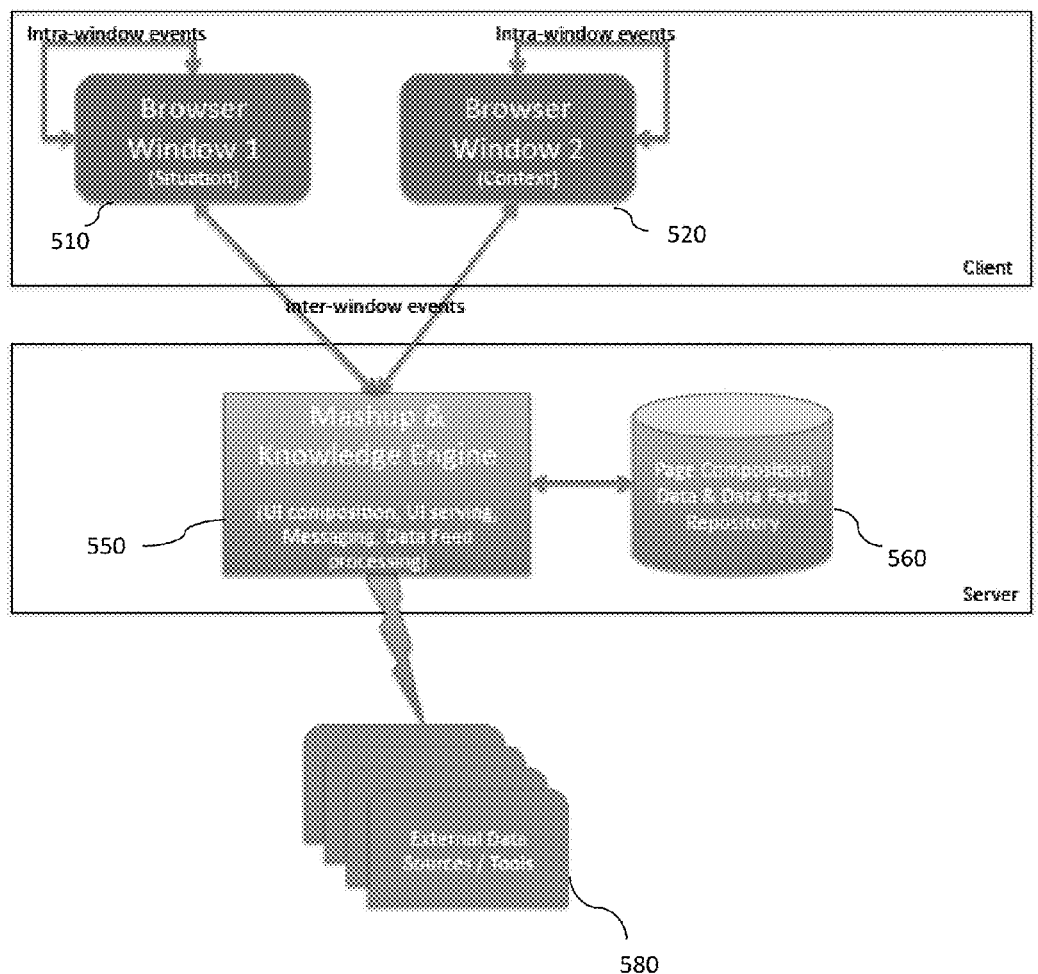
FIG. 5 shows a simplified illustration of a dual-screen display cockpit system, according to an embodiment of the present invention.

FIG. 5 shows an exemplary dual-screen display cockpit system 500 enabling situational awareness for IT operators, according to an embodiment of the present invention. On the client-side, we show Browser Window 1 510 with information about a situation (alerts, messages) and Browser Window 2 520 with the situational context for the events. Note that the browser windows here can represent windows, screens, terminals, dialog boxes, and the like. The latter browser window 520 contains the information automatically assembled, aggregated and rendered by the Mashup and Knowledge Engine 550. The diagram also shows events that are being tracked within and between browser windows, and between browser windows 510, 520 and the engine 550. It should be noted that although only two browser windows are shown here, the SA system 500 can support more than two browser windows (terminals, screens, monitors) within the spirit and scope of the invention.

On the server-side we show the Mashup Engine 550 in operative communication with a database 560 or data store housing the page composition data, templates, applications, and so forth required to configure the data for display in the browser windows. The database 560 provides the page composition data. The Mashup Engine 550 receives the event data from existing external data sources/tools 580 for operations management. The Mashup Engine 550 configures the interface 465 using the events as components that interact with each other and the server following user interaction with the Dashboard 465.

Using the method according to an embodiment of the invention, we are able to apply: a) a separation of global SA status from local focused task work by display screen and position; b) a dedicated display set for each active task allowing clean divisions when switching back to a previous task; and c) the use of an existing alert monitor and the display of open incidents as the principal drivers of prioritized input work.

We augment these features with:

d) collection of all displays associated with a focused task and the ability to switch entirely to that task as a set. Presenting the displays associated with the task as a set offloads the short-term memory demands on operators when dealing with multiple incidents simultaneously, while also allowing transfer of state intact to another operator station or to an SE (service engineer).

e) automatic propagation of fields based around new events and incidents selected;

f) automated logging and inter-screen transfer to reduce cut-and-paste to a minimum. The automated logging also acts as a reminder of state reached on a problem with last actions taken. Log of actions also available to IRC (Internet Relay Chat) participants.

g) displays of current team workload for efficient workload dispatch and team SA.

h) integrated dependency and current schema models and contextual script displays.

i) contextually-scripted "sidekick buddy" checklists to keep operators in the loop but safe for both types of checklists. Read-do or README (for checklists that are unusual or complex) and do-check i.e. post-action assertion verification (for more routine actions).

j) automated, asynchronous, call-out and information dissemination and escalation capabilities. With automated callback logging and intelligent automated re-direction to IRCs and calls. Internet Relay Chat is a protocol for real-time Internet text messaging (chat).

k) reduction in the salience of non-vital alerts to ensure salience is properly used to draw attention to high priority events. Saliency refers to the state or quality of an item that makes it stand out relative to its neighboring items. In simpler terms, saliency is what catches the eye.

l) trending displays for product service level agreements (SLAs) with drill-down support to help anticipate incidents and link to low-level causes.

Figure 8:
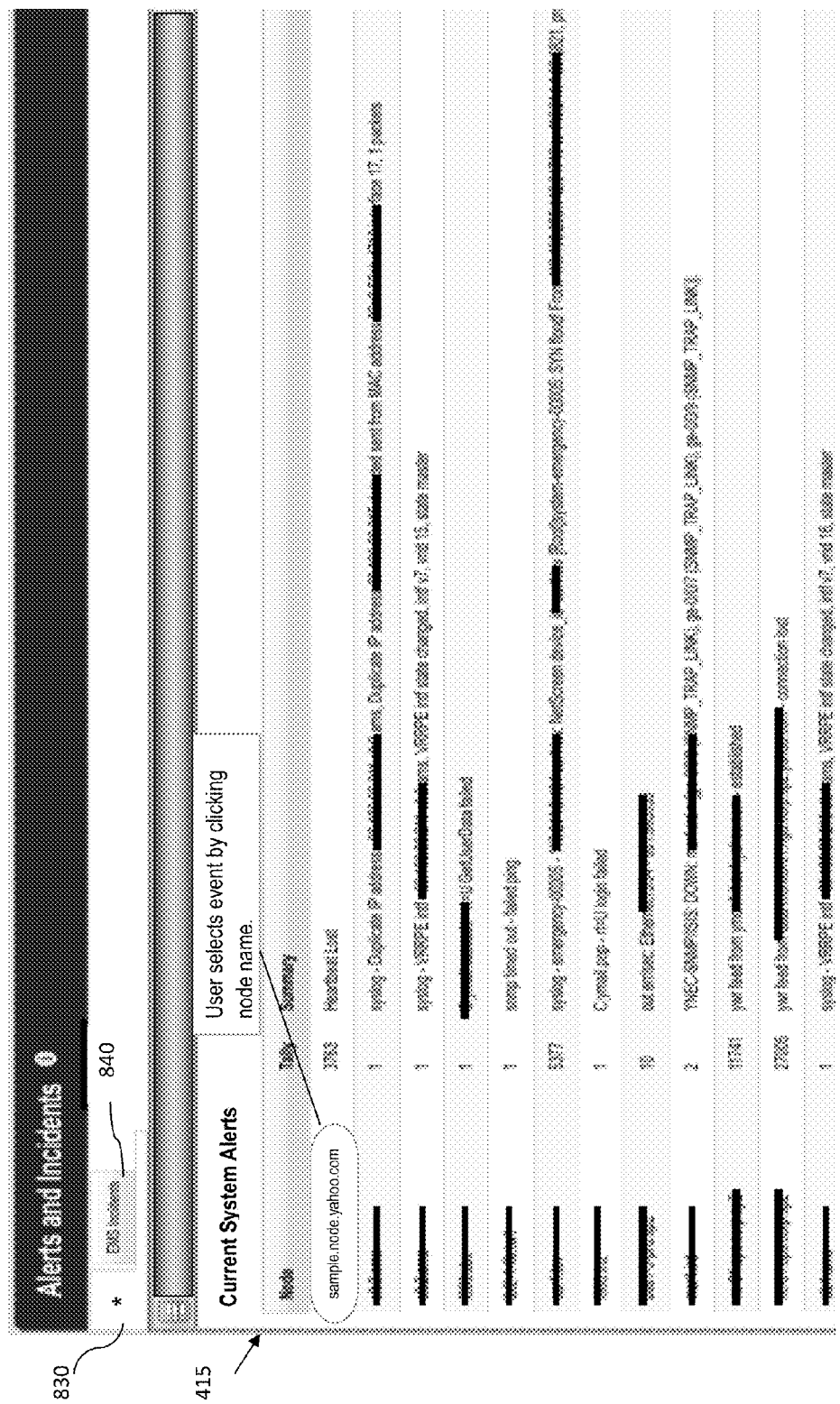
FIG. 8 is a screenshot of an exemplary situational display with an incoming alert stream, according to an embodiment of the present invention.

FIGS. 8 through 12 are screenshots providing examples of the above features. FIG. 8 shows a situational display with an incoming alert stream 415. The user is able to switch between "alert view" 830 and "incident view" 840 tabs. The list of alerts and incidents auto-refreshes. Clicking a row causes the context view (shown in FIG. 9) to update. In this example, the operator has clicked on the first row.

Figure 9:
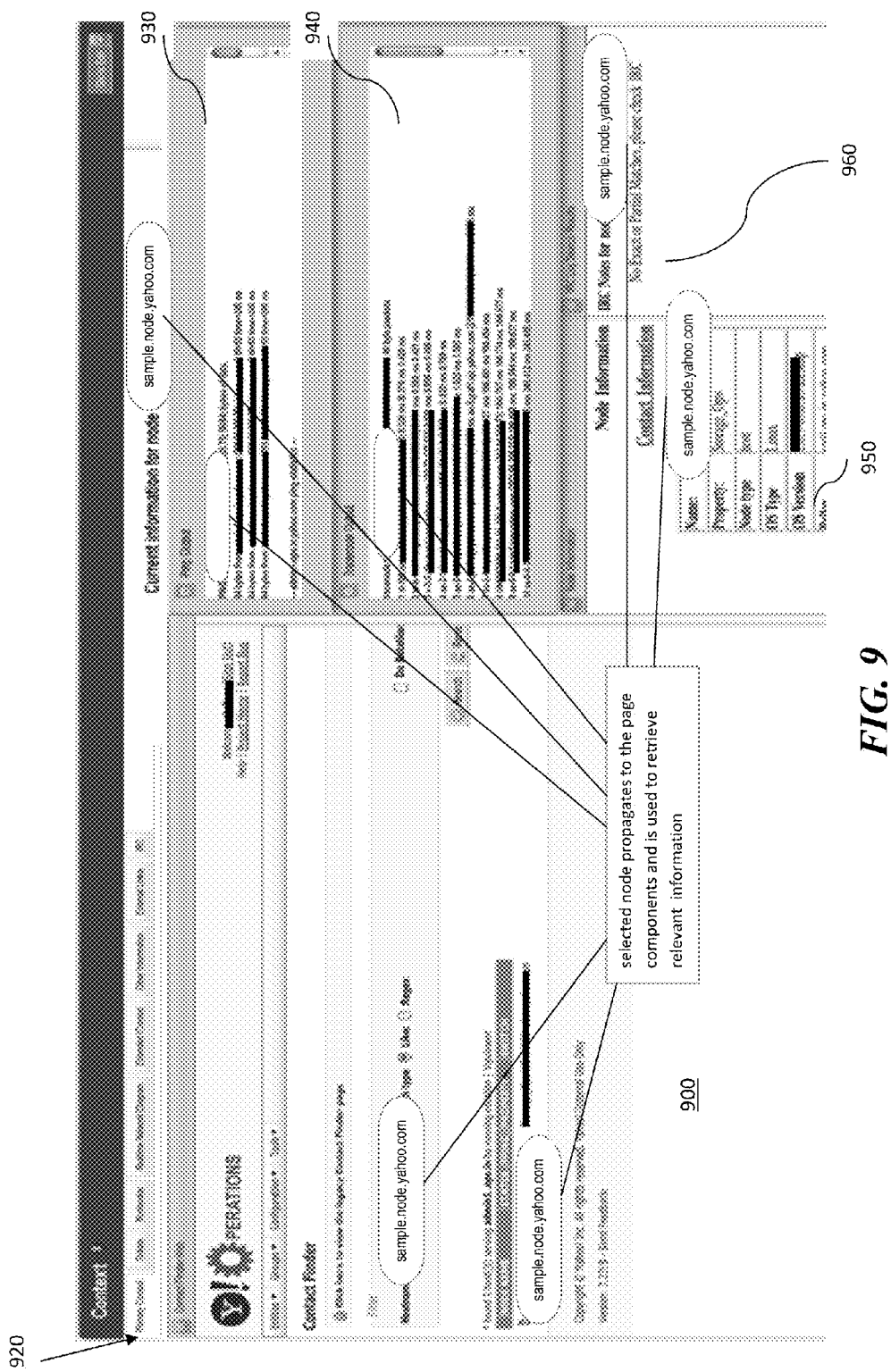
FIG. 9 is a screenshot of an exemplary context display, according to an embodiment of the present invention.
Figure 10:
FIG. 10 shows a screenshot of an exemplary sidekick-buddy checklist, according to an embodiment of the present invention.

FIG. 9 shows a context display 900 with the relevant situational context in plain view. The page widgets 930, 940, 950, and 960 receive click events from the alert view 830 and perform data lookup/command execution automatically. A widget is an app that can be easily installed and executed from within a web page. The operator 180 can select from a variety of additional views via the tab control 920. The two widgets 930 and 940 indicate the results of automatically executed commands against the selected node; whereas widgets 950 and 960 are data display widgets that display data resulting from queries of various data stores for information about the node. Note that this screenshot has been cropped to focus on the relevant sections FIG. 10 shows a context display with the 'Runbooks' tab selected, showing Sidekick buddy checklists 1010. The checklist 1010 is a page listing the detailed steps for handling various reported error conditions.

Figure 11:
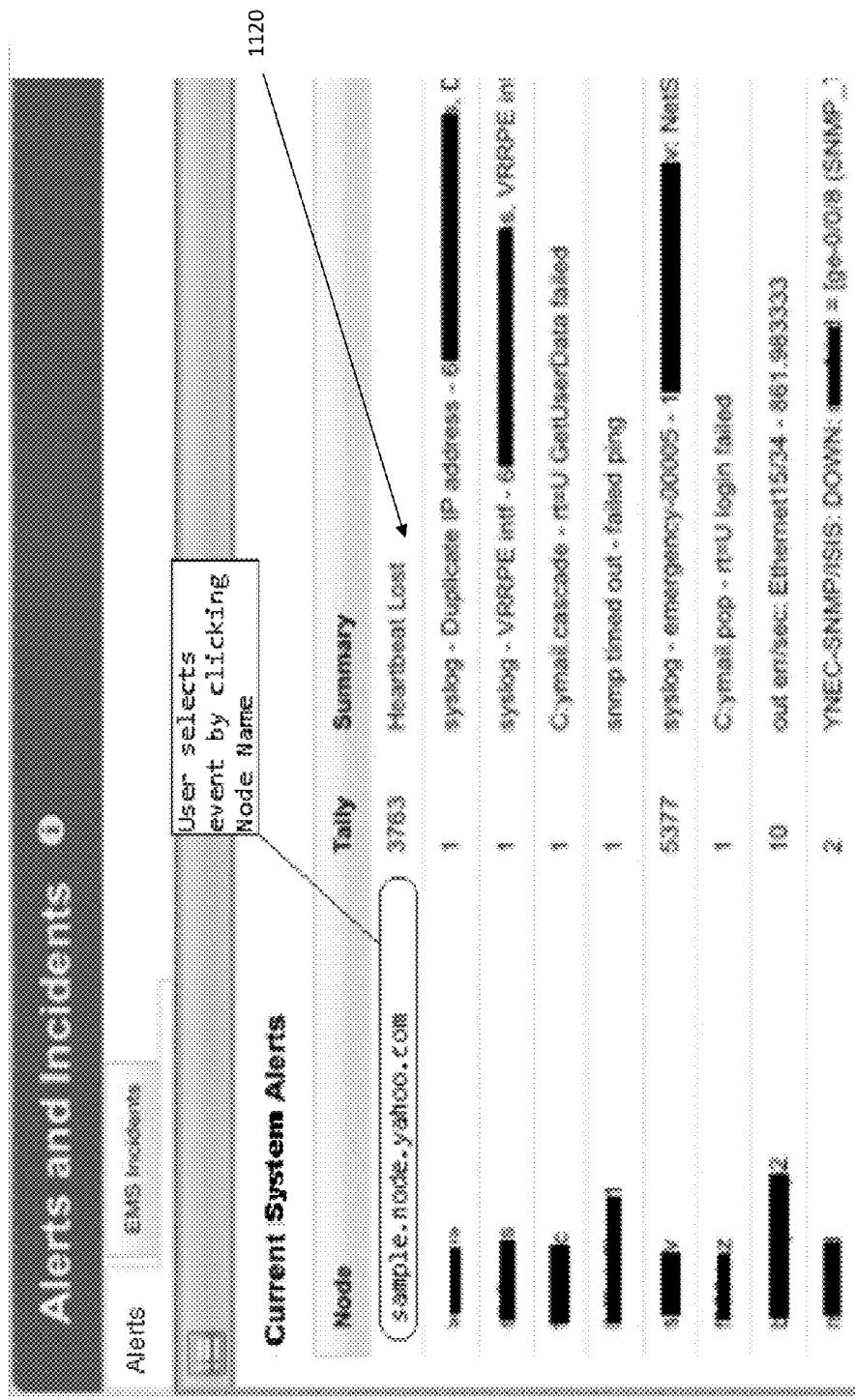
FIG. 11 shows a screenshot with an event selected, according to an embodiment of the present invention.
Figure 12:
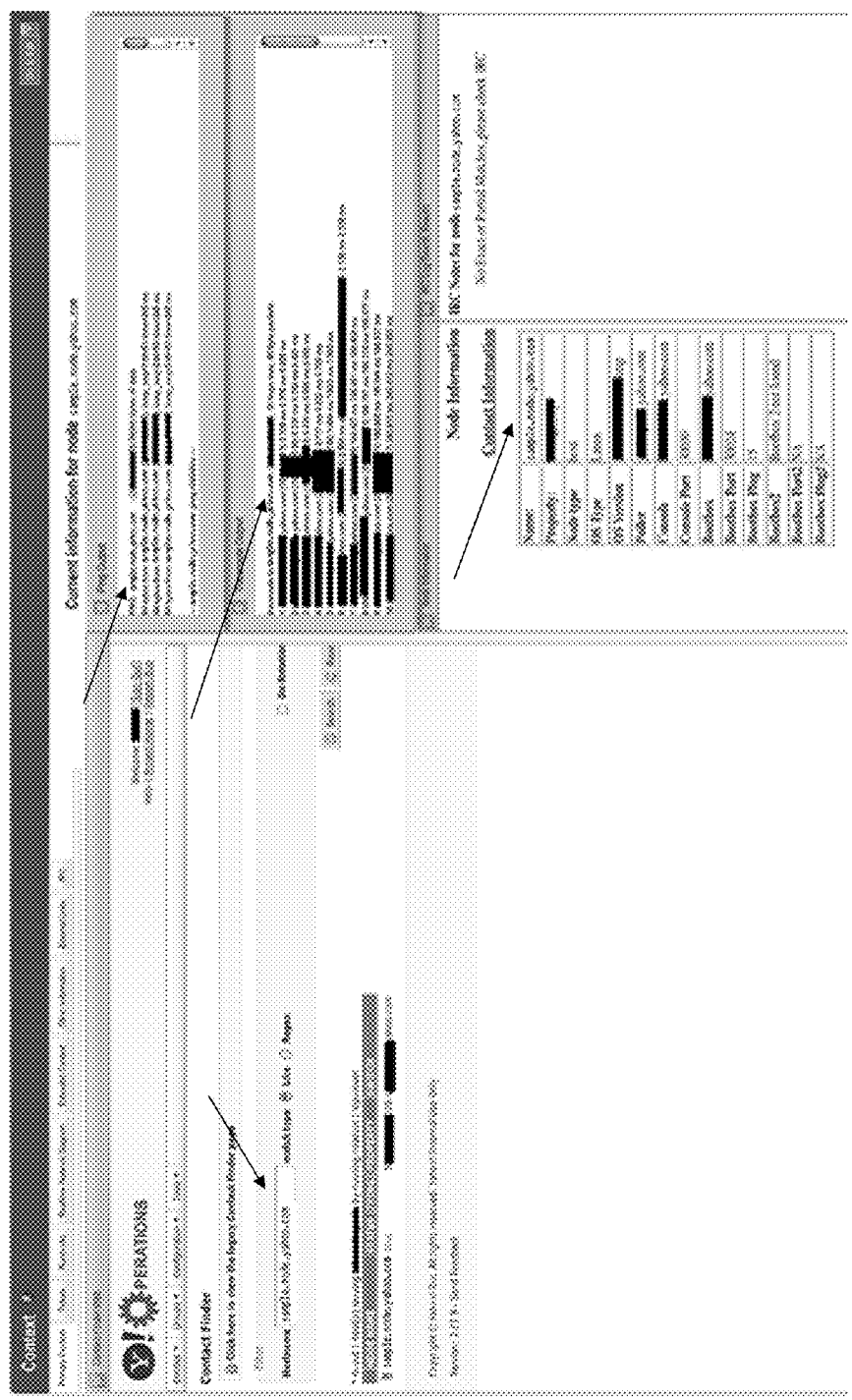
FIG. 12 shows a screenshot of the context view of the selected event, according to an embodiment of the present invention.

FIGS. 11 and 12 are two screenshots that illustrate the automatic field value propagation. FIG. 11 shows the Event/Incident view, which is automatically updated as new events occur in the system. When a user selects one of the events 1120 by clicking or otherwise selecting it, the name of the alerting node is propagated (shown by arrows) to the context view shown in FIG. 12 (this is a partial view due to size) and causes the components in that view to auto-populate with the relevant information.

Figure 6:
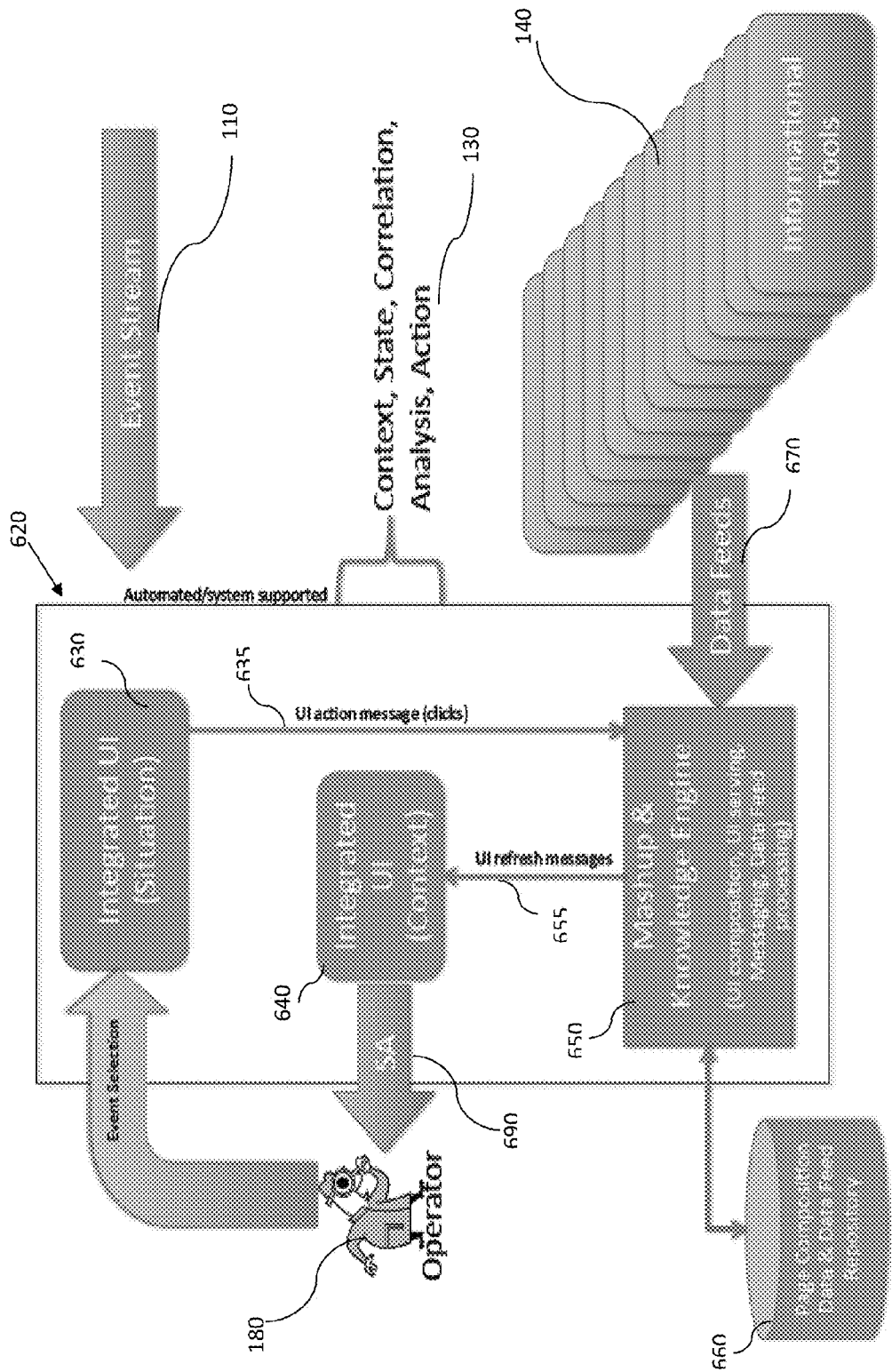
FIG. 6 is a simplified illustration of an operator scenario, according to an embodiment of the present invention.

FIG. 6 shows a data flow diagram representing IT operations management using situational awareness according to an embodiment of the present invention. The event stream 110, and the procedures 130 originally performed by the IT operator 180, and the informational tools 140 remain the same as those shown in FIG. 1. The primary difference here is that much of the work that was manually done by the operator 180 in FIG. 1 is now taken care of by the SA cockpit system 620. The system 620 incorporates an integrated user interface 630 displaying a situation, and an integrated user interface 640 displaying the context related to the situation (event). This dual user interface setup provides benefits of: a) automated organization of operator display to allocate screen real-estate to wider and narrower contexts, reinforcing mental separation of display data scopes; b) reduced context switching overhead when moving from one incident to another; c) easier handover of incident state elapsed time to another operator (whether for workload or for shift change); d) reduction of visual overload of incident eclipsing situational awareness, leading to lack of attention to new higher priority incidents, or correlation of this incident to others; e) increased potential for overview of team activities, training by screen shadowing and other additional values.

The dual-screen display including interfaces 630 and 640 provides automated linkages between multiple screen elements based on context, even when they are from widely different tools. With the dual-screen cockpit we facilitate the arrangement of tasks into those that support situational awareness onto one screen, and those that are about this particular incident on another screen. We also provide placement of these screens to align with brain-handedness of the operator 180.

A mashup and knowledge engine 650 provides automated organization by performing user interface composition, user interface serving, messaging, and data feed processing. The mashup engine 650 receives data feeds 670 from the informational tools 140 used by the system 620. The mashup engine 650 also receives action messages (via clicks) from the situational user interface 630. Additionally the mashup engine 650 employs a page composition data and data feed repository 660 to provide support for templating display so that it can be consistent among operators. This enables linking of a situation to the incident by selection in the situational display leading to re-population of the entire incident display. The mashup engine 650 further provides support for storing and restoring the state of the visual display for each incident.

Using these various sources, the mashup engine 650 provides user interface refresh messages 655 to the user interface providing context 640. This in turn produces the situational awareness 690 enabling the operator 180 to make more informed decisions and provides: a) faster resolution of incidents; b) higher number of simultaneous incidents handled by one operator 180; c) fewer higher priority incidents missed; d) easier training for operators 180; and e) easier handoff of incidents among team members.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Figure 7:
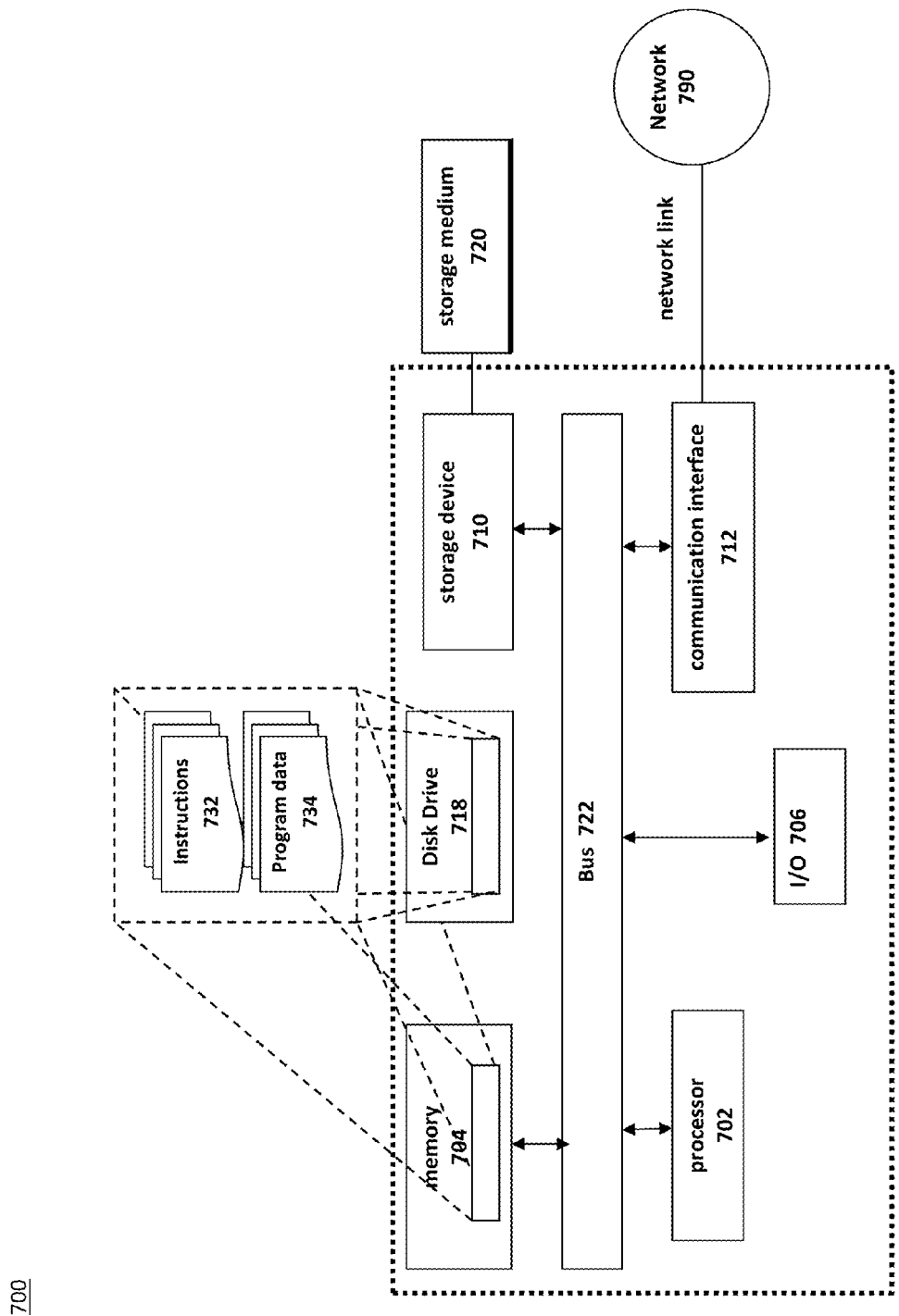
FIG. 7 is a high level block diagram showing an information processing system configured to operate according to an embodiment of the present invention.

Referring now to particularly FIG. 7, there is provided a simplified pictorial illustration of an information processing system 700 for providing situational awareness in which the present invention may be implemented. For purposes of this invention, computer system 700 may represent any type of computer, information processing system or other programmable electronic device, including a client computer, a server computer, a portable computer, an embedded controller, a personal digital assistant, and so on. The computer system 700 may be a stand-alone device or networked into a larger system.

Computer system 700, illustrated for exemplary purposes as a networked computing device, is in communication with other networked computing devices (not shown) via network 710. As will be appreciated by those of ordinary skill in the art, network 710 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 700. As will be appreciated by those of ordinary skill in the art, aspects of the invention may be distributed amongst one or more networked computing devices which interact with computer system 700 via one or more data networks such as, for example, network 710. However, for ease of understanding, aspects of the invention have been embodied in a single computing device—computer system 700.

Computer system 700 includes processing device 702 which communicates with an input/output subsystem 706, memory 704, storage 710 and network 710. The processor device 702 is operably coupled with a communication infrastructure 722 (e.g., a communications bus, cross-over bar, or network). The processor device 702 may be a general or special purpose microprocessor operating under control of computer program instructions executed from memory 104 on program data 734. The program data 734 includes the objects and their metadata. The processor 702 may include a number of special purpose sub-processors such as the mashup engine 650, each sub-processor for executing particular portions of the computer program instructions. Each sub-processor may be a separate circuit able to operate substantially in parallel with the other sub-processors.

The memory 704 may be partitioned or otherwise mapped to reflect the boundaries of the various memory subcomponents. Memory 704 may include both volatile and persistent memory for the storage of: operational instructions 732 for execution by CPU 702, data registers, application storage and the like. Memory 704 preferably includes a combination of random access memory (RAM), read only memory (ROM) and persistent memory such as that provided by a hard disk drive 718. The computer instructions/applications that are stored in memory 704 are executed by processor 702. The computer instructions/applications 732 and program data 734 can also be stored in hard disk drive 718 for execution by processor device 702.

The I/O subsystem 706 may comprise various end user interfaces such as the dual cockpit displays. The I/O subsystem 706 may further comprise a connection to a network 790 such as a local-area network (LAN) or wide-area network (WAN) such as the Internet.

The computer system 700 may also include a removable storage drive 710, representing a floppy disk drive, a magnetic tape drive, an optical disk drive, etc. The removable storage drive 710 reads from and/or writes to a removable storage unit 720 in a manner well known to those having ordinary skill in the art. Removable storage unit 720, represents a floppy disk, a compact disc, magnetic tape, optical disk, CD-ROM, DVD-ROM, etc. which is read by and written to by removable storage drive 710. As will be appreciated, the removable storage unit 720 includes a non-transitory computer readable medium having stored therein computer software and/or data.

The computer system 700 may also include a communications interface 712. Communications interface 712 allows software and data to be transferred between the computer system and external devices. Examples of communications interface 712 may include a modem, a network interface (such as an Ethernet card), a communications port, a PCM-CIA slot and card, etc. Software and data transferred via communications interface 712 are in the form of signals which may be, for example, electronic, electromagnetic, optical, or other signals capable of being received by communications interface 712.

In this document, the terms "computer program medium," "computer usable medium," and "computer readable medium" are used to generally refer to both transitory and non-transitory media such as main memory 704, removable storage drive 720, a hard disk installed in hard disk drive 718, and signals. These computer program products are means for providing software to the computer system 700. The computer readable medium 720 allows the computer system 700 to read data, instructions, messages or message packets, and other computer readable information from the computer readable medium 720.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method comprising:
generating a user interface incorporating multiple display interfaces;
receiving event data corresponding to one or more issues experienced by multiple Internet services for a plurality of events monitored by an operator;
gathering context data for the plurality of events from multiple sources, wherein the context data comprises tasks for managing each of the plurality of events;
matching the plurality of events with the context data to generate matched context data;
configuring the multiple display interfaces to display the event data and the matched context data, the displaying comprising:
displaying the one or more issues experienced by the multiple Internet services, displaying a first incident causing a first issue experienced by a first Internet service of the multiple Internet services and displaying a second incident causing a second issue experienced by a second Internet service of the multiple Internet services, wherein the first incident is related to the second incident;
displaying a product service level agreement (SLA) at a first level; and
responsive to one or more selections associated with the product SLA at the first level, drilling down to a second level to anticipate incidents associated with the product SLA, wherein the product SLA at the second level comprises one or more links to one or more causes of one or more issues associated with the product SLA;
receiving a selection of a first event of the plurality of events; and
displaying a first window comprising ping output information associated with the first event while concurrently displaying a second window comprising traceroute output information associated with the first event and a third window comprising Internet Relay Chat (IRC) information associated with the first event responsive to receiving the selection, the IRC information intelligently automatically redirected to one or more IRC users.

2. The method of claim 1 wherein the context data comprises contact information for one or more entities associated with a second event.

3. The method of claim 2 further comprising displaying the contact information concurrently with displaying a list of tasks responsive to receiving a selection of the second event.

4. The method of claim 1 further comprising determining a first priority of a first set of events of the plurality of events, and determining a second priority of a second set of events of the plurality of events.

5. The method of claim 1 wherein a list of tasks is displayed in a checklist format.

6. The method of claim 4 further comprising emphasizing the first set of events based upon the first priority and deemphasizing the second set of events based upon the second priority, wherein the first priority is higher than the second priority.

7. The method of claim 1 further comprising:
receiving a selection of a priority event of a set of priority events determined from the plurality of events; and
displaying a list of tasks associated with the priority event.

8. The method of claim 1 wherein the context data comprises detailed instructions on managing the plurality of events.

9. The method of claim 1 further comprising storing the plurality of events with the matched context data.

10. A computer-implemented system comprising:
a memory comprising computer-executable instructions that when executed, cause a computer to perform:
generating a user interface incorporating multiple display interfaces;
receiving event data corresponding to one or more issues experienced by multiple Internet services for a plurality of events monitored by an operator;
gathering context data for the plurality of events from multiple sources, wherein the context data comprises tasks for managing each of the plurality of events;
matching the plurality of events with the context data to generate matched context data;
configuring the multiple display interfaces to display the event data and the matched context data, the displaying comprising:
displaying the one or more issues experienced by the multiple Internet services, displaying a first incident causing a first issue experienced by a first Internet service of the multiple Internet services and displaying a second incident causing a second issue experienced by a second Internet service of the multiple Internet services, wherein the first incident is related to the second incident;
displaying a product service level agreement (SLA) at a first level; and
responsive to one or more selections associated with the product SLA at the first level, drilling down to a second level to anticipate incidents associated with the product SLA, wherein the product SLA at the second level comprises one or more links to one or more causes of one or more issues associated with the product SLA;
receiving a selection of a first event of the plurality of events; and
displaying a first window comprising ping output information associated with the first event while concurrently displaying a second window comprising traceroute output information associated with the first event and a third window comprising Internet Relay Chat (IRC) information associated with the first event responsive to receiving the selection, the IRC information intelligently automatically redirected to one or more IRC users; and
a processor device operably coupled with the memory for executing the instructions.

11. The computer-implemented system of claim 10 wherein the context data comprises contact information for one or more entities associated with a second event.

12. The computer-implemented system of claim 11 wherein the instructions further cause the computer to perform displaying the contact information concurrently with displaying a list of tasks responsive to receiving a selection of the second event.

13. The computer-implemented system of claim 10 wherein the instructions further cause the computer to perform determining a first priority of a first set of events of the plurality of events, and determining a second priority of a second set of events of the plurality of events.

14. The computer-implemented system of claim 10 wherein a list of tasks is displayed in a checklist format.

15. The computer-implemented system of claim 13 wherein the instructions further cause the computer to perform emphasizing the first set of events based upon the first priority and deemphasizing the second set of events based upon the second priority, wherein the first priority is higher than the second priority.

16. The computer-implemented system of claim 10 wherein the instructions further cause the computer to perform:
    receiving a selection of a priority event of a set of priority events determined from the plurality of events; and
    displaying a list of tasks associated with the priority event.

17. The computer-implemented system of claim 10 wherein the context data comprises detailed instructions on managing the plurality of events.

18. The computer-implemented system of claim 10 wherein the instructions further cause the computer to perform storing the plurality of events with the matched context data.

19. A computer program product comprising a non-transitory computer-readable storage medium comprising instructions that when executed by a computer, cause the computer to perform:
    generating a user interface incorporating multiple display interfaces;
    receiving event data corresponding to one or more issues experienced by multiple Internet services for a plurality of events monitored by an operator;
    gathering context data for the plurality of events from multiple sources, wherein the context data comprises tasks for managing each of the plurality of events;
    matching the plurality of events with the context data to generate matched context data;
    configuring the multiple display interfaces to display the event data and the matched context data, the displaying comprising:
        displaying the one or more issues experienced by the multiple Internet services, displaying a first incident causing a first issue experienced by a first Internet service of the multiple Internet services and displaying a second incident causing a second issue experienced by a second Internet service of the multiple Internet services, wherein the first incident is related to the second incident;
        displaying a product service level agreement (SLA) at a first level; and
        responsive to one or more selections associated with the product SLA at the first level, drilling down to a second level to anticipate incidents associated with the product SLA, wherein the product SLA at the second level comprises one or more links to one or more causes of one or more issues associated with the product SLA;
    receiving a selection of a first event of the first set of the plurality of events; and
    displaying a first window comprising ping output information associated with the first event while concurrently displaying a second window comprising traceroute output information associated with the first event and a third window comprising Internet Relay Chat (IRC) information associated with the first event responsive to receiving the selection, the IRC information intelligently automatically redirected to one or more IRC users.

20. The computer program product of claim 19 wherein the instructions further cause the computer to perform displaying a fourth window comprising node information associated with the first event while concurrently displaying the first window, the second window and the third window.

* * * * *